US006824756B2

(12) United States Patent
Rosenblatt et al.

(10) Patent No.: US 6,824,756 B2
(45) Date of Patent: Nov. 30, 2004

(54) PROCESS FOR MANUFACTURING AND USING A MORE STABLE FORMULATION OF SODIUM CHLORITE

(75) Inventors: Aaron A. Rosenblatt, New York, NY (US); Thomas E. McWhorter, Allentown, PA (US); Nicholas Franco, Bethlehem, PA (US); Barzin Keramati, Bethelhem, PA (US)

(73) Assignee: CDG Technology, Inc., Allentown, PA (US)

( * ) Notice: Subject to any disclaimer, the term of this patent is extended or adjusted under 35 U.S.C. 154(b) by 288 days.

(21) Appl. No.: 10/150,835

(22) Filed: May 17, 2002

(65) Prior Publication Data

US 2003/0215381 A1 Nov. 20, 2003

(51) Int. Cl.$^7$ .............................. C01B 11/10
(52) U.S. Cl. ................ 423/472; 423/265; 423/266; 423/275; 423/475
(58) Field of Search ............... 423/265, 266, 423/275, 472, 475

(56) References Cited

U.S. PATENT DOCUMENTS

| 3,006,721 A | | 10/1961 | Mollard | |
|---|---|---|---|---|
| 3,844,726 A | * | 10/1974 | Denaeyer et al. | 423/472 |
| 3,967,039 A | * | 6/1976 | Ninane et al. | 423/472 |
| 3,997,462 A | * | 12/1976 | Denaeyer et al. | 423/472 |
| 4,044,103 A | | 8/1977 | Mollard et al. | |
| 4,681,739 A | | 7/1987 | Rosenblatt et al. | |
| 5,110,580 A | | 5/1992 | Rosenblatt et al. | |
| 5,234,678 A | | 8/1993 | Rosenblatt et al. | |

FOREIGN PATENT DOCUMENTS

| EP | 0 832 845 A2 | 4/1998 |
|---|---|---|
| GB | 1332764 | 10/1973 |
| GB | 1386911 | 3/1975 |
| JP | 51 149868 | 12/1976 |

OTHER PUBLICATIONS

International Search Report, Application No. PCT/US 03/15877 dated Sep. 5, 2003.

* cited by examiner

*Primary Examiner*—Ngoc-Yen Nguyen
(74) *Attorney, Agent, or Firm*—RatnerPrestia

(57) ABSTRACT

Method for producing stable sodium chlorite by pelletization of granular sodium chlorite with metal salt or salts forming hydrates with water of hydration in the pellets being more than 5% of the anhydrous weight of the sodium chlorite. Pelletized sodium chlorite can be used to produce chlorine dioxide gas by passing a dilute mixture of chlorine gas and an inert gas through a bed of the pellets.

6 Claims, 6 Drawing Sheets

PROCESS FOR MANUFACTURING AND USING A MORE STABLE FORMULATION OF SODIUM CHLORITE

BACKGROUND OF THE INVENTION

Sodium chlorite is a strong oxidizer which is manufactured as either a solid or as an aqueous solution. It is used in various well-known processes, for example, to bleach textiles, and to oxidize contaminants in drinking water and waste water. As described in chapter 12 of the Fourth Edition of Handbook of Chlorination and Alternative Disinfectants edited by George Clifford White sodium chlorite is also used to produce chlorine dioxide which is a powerful and selective oxidant and disinfectant. Chlorine dioxide produced in these processes is used for many purposes including, treatment of drinking water and waste water, disinfection and preservation of food, and sterilization of medical devices as disclosed in U.S. Pat. No. 4,681,739. In many of these processes, sodium chlorite is supplied as an aqueous solution. In some processes, such as the Gas:Solid process described in the White reference, sodium chlorite is used as a granular solid. Sodium chlorite is also supplied as a solid to some users who dissolve it near the point of use and use it as an aqueous solution.

U.S. Pat. No. 5,110,580 teaches that in order for the Gas:Solid process to function efficiently two conditions must be satisfied. First, the gas must be humidified. Otherwise, the patentees teach, the Gas:Solid reaction may cease to function. Secondly, pre-treatment of the sodium chlorite is necessary to remove some or all of the sodium hydroxide. Otherwise, the chlorine flowing through the solid bed will preferentially react with the sodium hydroxide until the hydroxide is consumed and start-up of the process will be delayed.

U.S. Pat. No. 4,044,103 describes a process for making storage-stable sodium chlorite. In this process a salt which forms a hydrate is added to sodium chlorite with water and then dried. The final composition of the material is such that it contains a weight of water (as hydrate) equal to at least about 5% of the anhydrous weight of the sodium chlorite. If this criteria is met, patentees teach that the resulting sodium chlorite formulation does not propagate decomposition upon sudden local heating, even to a high temperature. Patentees describe various ways to mix the sodium chlorite and the hydrating salt including, adding dry ground hydrated salt to a paste of sodium chlorite and drying the resulting paste, and adding a solution of hydrating salt to dry sodium chlorite and drying the resulting paste.

It is important to note that all of the processes taught in the '103 patent use large amounts of excess water which is evaporated away at elevated temperatures (typically 45° C.) after the salts are mixed. Patentees also teach the use of various hydrating salts with high melting points and combinations of salts with high melting points to prevent melting of the product in hot weather. In all of the examples cited, drying of the product is required, typically at 45° C.

BRIEF SUMMARY OF THE INVENTION

The present invention is a process for manufacturing agglomerated sodium chlorite particles suitable for, inter alia, producing chlorine dioxide by the Gas:Solid process. A particular useful form of agglomerated particles are pellets. The pellets manufactured according to the present invention do not propagate the decomposition reaction of sodium chlorite even when locally heated to very high temperatures. These pellets resist melting at temperatures normally found in the work environment. Compared to other sodium chlorite formulations these pellets are more resistant to combustion when mixed with a fuel. Also the pellets are approximately uniform in size and are approximately spherical in shape. The pellets produced by the present invention permit uniform flow of gas through a bed of the pellets with less pressure drop than a comparable bed of flakes of the same composition. The pellets produced according to the present invention are permeable to the mass transfer of gas into and out of the particles during the Gas:Solid process. They dissolve rapidly when mixed with water, do not require humidification of the gas when used in the Gas:Solid process, and do not require pretreatment for removal of hydroxide in order to achieve rapid start-up of chlorine dioxide production in the Gas:Solid process.

Thus, in one aspect the present invention is a method for producing a stable form of sodium chlorite comprising the steps of, introducing water and granular sodium chlorite combined with one of a metal salt or salts that form hydrates in an amount sufficient so that when fully hydrated the water of hydration is more than about 5% of the anhydrous weight of the sodium chlorite with water the amount of water being less than the weight of water required to fully hydrate the salts, but more than 5% of the anhydrous weight of the sodium chlorite, into a pelletizing apparatus and recovering pellets being of a size to pass a three mesh screen pellet.

The present invention includes using a salt that is also sufficiently soluble in water having a melting point above 50° C. added in solution form in an amount to raise the melting point of the final particles to more than 50° C., while adding less water than required to fully hydrate the full amount of hydrating salts in the mixture.

In another aspect the present invention is a method of producing chlorine dioxide gas by passing a dilute mixture of chlorine gas with an inert gas being one of air or nitrogen through a bed of sodium chlorite pellets containing water of hydration greater than about 5% of the anhydrous weight of sodium chlorite.

DETAILED DESCRIPTION OF THE INVENTION

Solid sodium chlorite is commonly manufactured, shipped and stored as approximately 80% sodium chlorite with approximately 20% diluent salts. Some of the diluent salts, such as sodium chloride, are inert stabilizers. Others, such as sodium hydroxide, sodium carbonate and other alkali salts, serve to reduce the risk of accidental acidification of the sodium chlorite, which would produce chlorine dioxide gas.

In the 80% solid sodium chlorite form typically supplied commercially, sodium chlorite can react with any fuel to produce vigorous combustion. In many cases, a source of ignition is required in order to produce combustion of a fuel/sodium chlorite mix. In other cases, when the typical 80% formulation of sodium chlorite is mixed with reducing agents (for example some petroleum products), sodium chlorite can spontaneously begin to burn with the reducing agent. If the typical 80% formulation of sodium chlorite is heated to approximately 150° C., the material may begin to undergo self-heating caused by the exothermic decomposition of the sodium chlorite into oxygen, sodium chlorate and sodium chloride. If the heating continues (either from an external heat source or from self-heat) the material may undergo a "runaway reaction".

Figure 1:
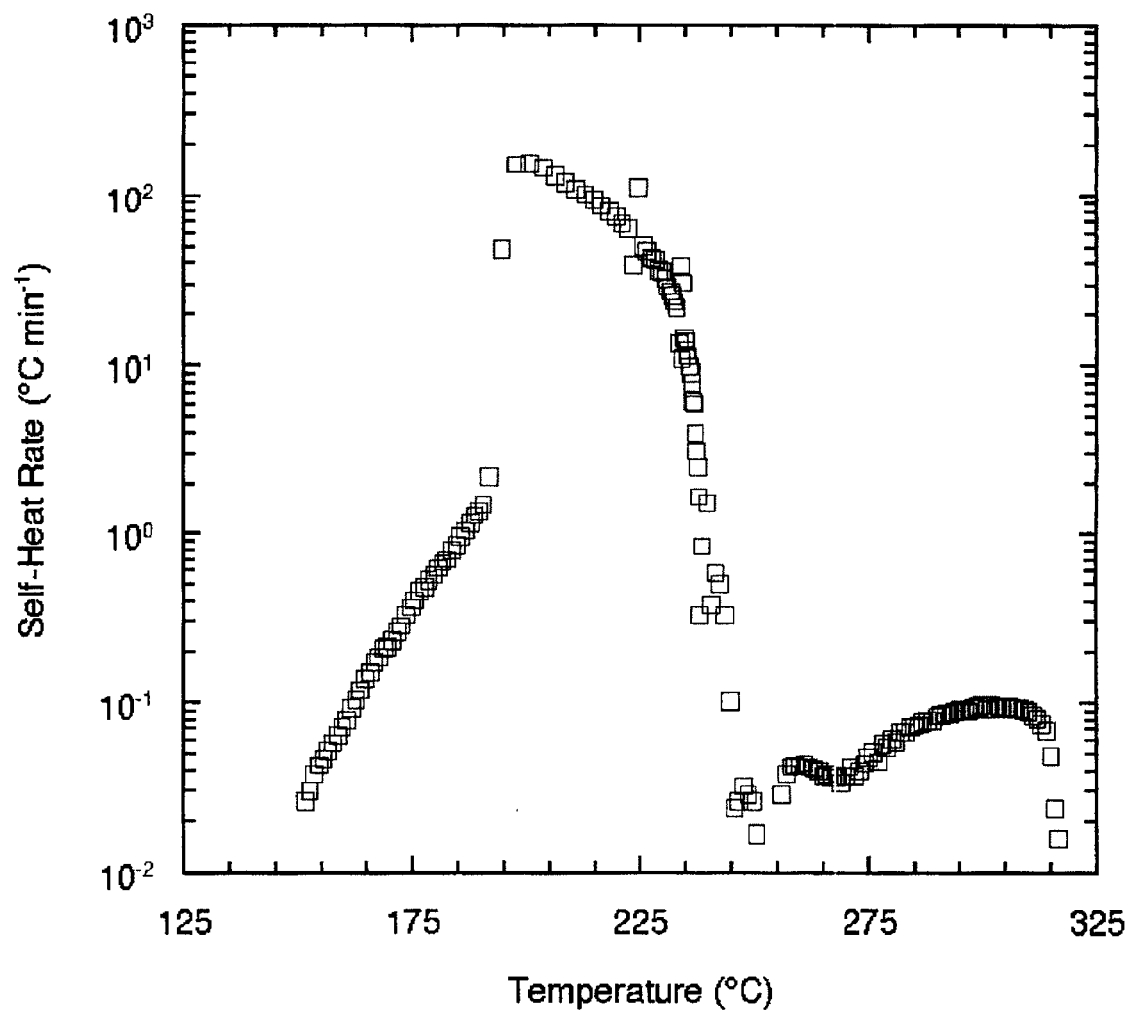
FIG. 1 is a plot of self-heating rate against temperature for a sample of technical grade sodium chlorite from an Accelerating Rate Calorimetry Test.

FIG. 1 is a plot of self-heat rate against temperature produced in an Accelerating Rate Calorimetry (ARC) test of a sample of commercially available technical grade sodium chlorite. Of particular note is that the onset temperature of self-heating is about 151° C., the maximum self-heat rate (a key measure of the potential for a runaway reaction) is about 154° C. per minute which occurs at about 200° C. In this case the very high self-heat rate at about 200° C. indicates a runaway reaction.

It is to be noted that in the commercial sample tested, if the sodium chlorite was heated locally to the point at which it begins to visibly decompose, the decomposition reaction propagates through the entire sample of sodium chlorite. If this occurs when sodium chlorite is piled loosely, the result is a foaming reaction that spreads slowly through the pile until all of the sodium chlorite is consumed. Various sources in the literature indicate that this reaction is the exothermic decomposition of sodium chlorite into sodium chlorate, sodium chloride, and oxygen. Various references indicate that the heat of decomposition causes the sodium chlorate to melt and form a white foam as oxygen bubbles through it. If external heating continues, or if heat produced in the reaction cannot be dissipated, the sodium chlorate may break down further, releasing still more sodium chloride, heat and oxygen. If the sodium chlorite begins to decompose in a similar way inside a container such as a drum, the evolving oxygen and expanding foam may burst the container.

The potential for decomposition of sodium chlorite is especially of concern where solid sodium chlorite is used as a reagent, e.g. in the Gas:Solid process. Local decomposition may be initiated in this process by the ignition of small amounts of contaminants. Heating of the sodium chlorite may also be exacerbated by the exothermic reaction of chlorine (one of the reagents in the process) with the sodium hydroxide contained in the sodium chlorite.

The Gas:Solid process involves the reaction of dilute gaseous chlorine with solid sodium chlorite. In this process, the dilute chlorine flows through a bed of granular solid sodium chlorite. In order for this reaction to occur efficiently, the bed of sodium chlorite must be permeable enough to permit the percolation of gas through the bed. There must also be adequate surface-to-volume ratio in the solid particles to permit mass transfer of gas into and out of the solid particles.

Solid sodium chlorite is commercially available in the USA in two forms:

1. Flake material made by drying a solution of sodium chlorite and diluent salts on a drum flaker. The particle size of the resulting material is non-uniform. In the Gas:Solid process this non-uniformity results in non-uniform flow of gas through the solid bed. This causes channeling of the gas, which, in turn, can cause premature breakthrough of unreacted chlorine.
2. Powder material made by spray-drying a solution of sodium chlorite and other salts. The result is a fine powder that packs into containers so gas cannot readily permeate the powder.

In the present invention, dry sodium chlorite powder or small dry granules of sodium chlorite, containing other salts which can form hydrates, are mixed with an amount of water sufficient to partially hydrate the hydrating salts. The dry mixture of salts may also contain inert salts such as sodium chloride. The water and the mixture of sodium chlorite and hydrating salts are mixed in a manner so that the water is dispersed in an approximately uniform distribution through the powder, with mechanical agglomeration to form larger particles of solids (pellets) bound together by water. The amount of water added is equal to at least about 5% of the anhydrous weight of the sodium chlorite. The amount of water is also sufficient to permit the formation of coherent pellets, with only small amounts of unagglomerated powder remaining. The amount of water added is less than that required to form "wet" paste containing more water than required for complete hydration of the hydrating salts. Therefore no drying is required.

Table 2 sets forth a typical composition of the commercially available sodium chlorite powder used in all cases cited herein referring to sodium chlorite powder.

TABLE 2

Composition (% by weight) of Sodium Chlorite Powder

| Constituent | % by weight |
| --- | --- |
| Sodium chlorite | 79.8 |
| Sodium sulfate | 4.8 |
| Sodium carbonate | 6.1 |
| Sodium chloride | 8.5 |
| Sodium hydroxide | 0.29 |
| Water | 0.39 |
| Sodium chlorate | 0.13 |

Pellets produced with excess water are pasty and tend to stick together or form larger pellets. Pellets made with excess water may be dried as taught in the art.

When the water and dry sodium chlorite powder are mixed, the resulting hydration is typically exothermic. Depending on the composition of the pellets, the heat released may be sufficient to heat the pellets to a temperature above the melting point of the hydrated salt. Following agglomeration, the pellets are cooled until they solidify. Depending on the formulation of the pellets, different amounts of cooling are required.

With the process of the present invention no drying is required. Experimentation and tests have shown that solidification of the pellets produced according to the process of the present invention require cooling, not drying. As part of the development of the present invention the inventors have shown:

1. Solidification rate is faster when the pellets are exposed to cool air than when exposed to warm air under the same conditions.
2. Solidification rate appears unaffected by relative humidity.

3. Solidification occurs in sealed containers where there is no convection to remove evaporated water.
4. In sealed containers, solidification occurs faster near the wall of the container than in the center. In the same container, the solidified pellets near the wall are noticeably cooler than the ones near the center.
5. Large pellets can be immersed in cold water. A solid paste layer will form on the outside of the pellet, slowing the dissolution of the pellet. The cooling effect of the water will cause the pellet to harden, even under water.

As with prior art compositions hydrating salts may be added to the sodium chlorite used in the present invention either in dry form or in solution in the water that is added.

According to the prior art the melting point of the product can be increased by adding salts whose hydrates have high melting points. The '103 patent points out the dangers of adding toxic salts or salts that can react with sodium chlorite. Experimentation has also shown that some salts listed as safe in the '103 patent can produce hazardous conditions when used in the current invention. It has been shown that salts of magnesium, when added in solution to form pellets in the current invention, will produce substantial volumes of chlorine dioxide gas during the curing process and will continue to produce this gas for hours or even days after the pellets are produced. This gas can become a breathing hazard in the workplace. If the gas is evolved in sealed containers, it may reach sufficient concentrations to explode spontaneously. The mechanism of this reaction is not understood. Tests show, however, that when solutions of magnesium sulfate or magnesium chloride were added to powdered 80% sodium chlorite, visible concentrations of chlorine dioxide were produced over the period of several hours, and lesser amounts were still evolving several days later. Addition of solutions of potassium carbonate produced less chlorine dioxide than the magnesium salts, but still produced enough to cause concern. Addition of water to the same sodium chlorite powder caused no evolution of gas. Addition of water containing sodium carbonate and sodium phosphate to the same sodium chlorite powder caused no gas evolution.

The following example is illustrative of the present invention.

EXAMPLE

Sodium chlorite powder of the composition shown in Table 2 is metered at a rate of 900 pounds per hour into a 3-foot pan pelletizer (also known as a pan agglomerator) produced by many companies such as Mars Mineral of Mars, Pa. The 3-foot dimension refers to the approximate diameter of the rotating pan. The pan rotates at a constant speed of 20 RPM with its axis of rotation disposed at an angle of 60 degrees from the horizontal. Water is sprayed at about 1 liter per minute into the pan slightly below the point of powder entry. Pellets begin to build up in the pan and grow in diameter through the process of "snowballing" until pellets begin to overflow the side of the pan near the bottom. Pellets conveyed away from the pelletizer are maintained in a shallow layer and agitated until they cool and harden. This can be accomplished in a number of ways including but not limited to; packing the pellets into partially filled drums and rolling the drums during the cooling process, drawing cool air through the drums into which the pellets are being filled, conveying on a belt conveyor with cool air blowing over the pellets, passing the pellets through a vibrating screener with cooling air provided, or using any of a variety of devices (such as fluidized beds, cooling screw conveyors, spiral cooling systems) that provide a combination of cooling and agitation. When the pellets have cooled and hardened they are free flowing and can be readily packed in drums for use in the Gas:Solid process or other processes.

The time required for cooling depends on the pellet formulation and the cooling process. For the composition shown in Table 2 cooling time varies from a minute or less in forced convection to 18–24 hours if the pellets are cooled in drums.

Pellets produced using the formulation shown in Table 2 begin to soften at about 40–50° C. Therefore they should only be used in climates or applications where they will not be exposed to temperatures above that level.

The prior art teaches that the melting point of the pellets can be increased by adding salts whose hydrates have a high melting point. In order to produce high melting point formulations, and to meet the other criteria of the present invention, the salt to be added must achieve its effect at a concentration low enough so that it can be added at that level without adding too much water in the process. Sodium phosphate can achieve the effect of raising the melting point when it is incorporated at a level of about 9%. When water containing salt is used in the pelletizing process, the ratio of water feed to powder feed must be increased.

Figure 2:
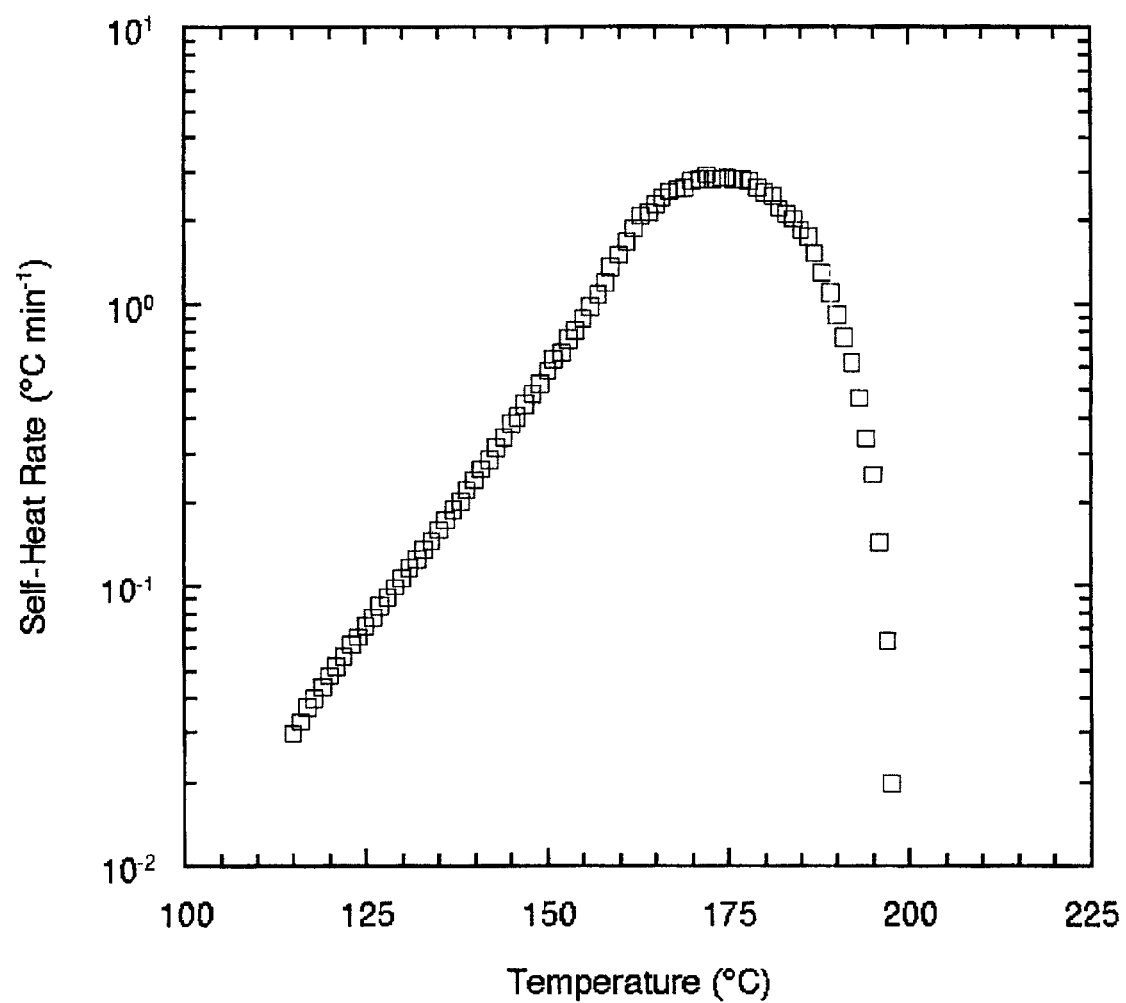
FIG. 2 is a plot of self-heating rate against temperature for a sample of sodium chlorite pellets, produced according to the present invention, from an Accelerating Rate Calorimetry Test.

Pellets produced according to the invention by adding water to sodium chlorite powder containing hydrating salts exhibited thermal stability far superior to flaked material. FIG. 2 is a plot of the self-heat rate against temperature measured in an ARC test of pellets produced by adding water to the sodium chlorite composition shown in Table 2. The resulting pellets contained water equal to about 14% by weight. It should be noted that the maximum self-heat rate for the pellets is about 3° C. This is only about 2% of the rate measured for commercially available flakes. This indicates a far more stable material.

Table 3 shows the key data measured in the ARC test. The data in Table 3 were taken using a 10 inch column of salt in each test cartridge with a flow of a gas mixture of 4% chlorine in commercially pure nitrogen without pre-humidification of the contents of the column.

TABLE 3

| Materials | Wt (gm) | Minutes to Steady State Production | Minutes to Cl2 Break | Calculation of NaClO2 gm Consumed | |
|---|---|---|---|---|---|
| | | | | At Breakthru Based on Cl2 Consumed | % Reacted |
| Vulcan Flake* | 588 | 15.0 | 406 | 199 | 42 |
| +3 Mesh Pellets | 496 | 2.5 | 303 | 148 | 41 |
| −3 +6 Mesh Pellets | 478 | 1.8 | 390 | 191 | 55 |
| −6 +12 Mesh Pellets | 424 | 3.0 | 388 | 190 | 62 |
| −12 +28 Mesh Pellet | 442 | 6.0 | 486 | 238 | 75 |

*Run indicated no difference relative to runs with pre-humidification

Figure 5:
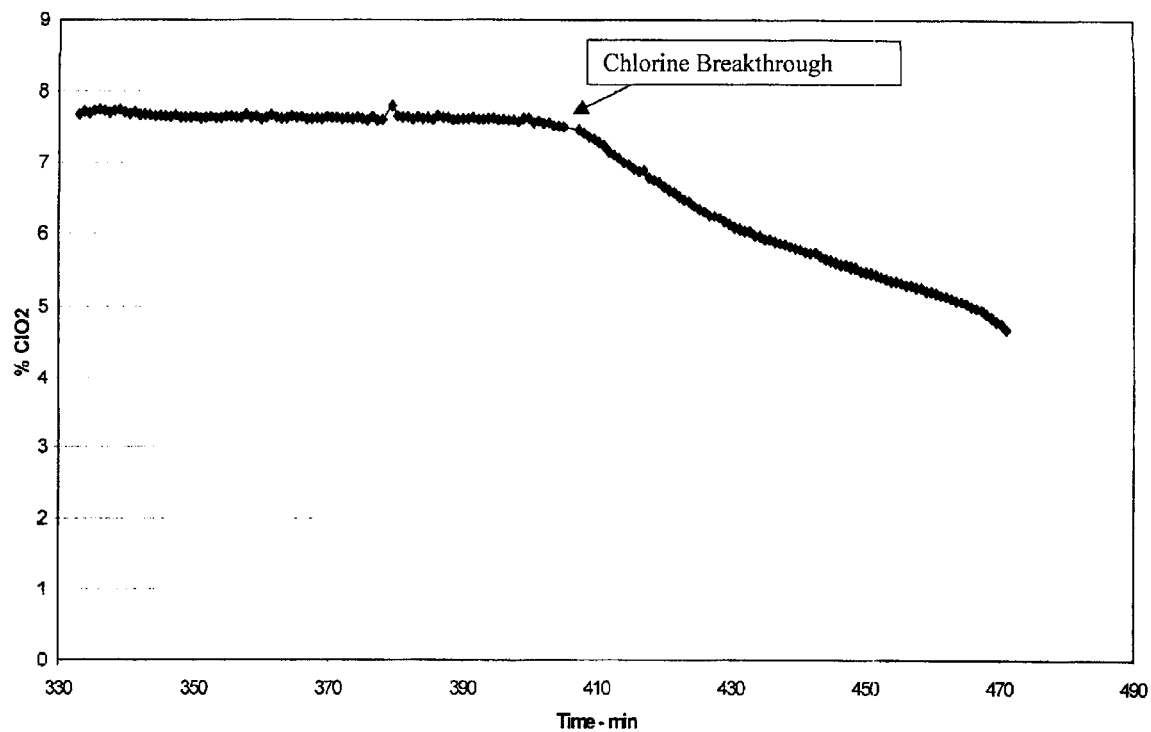
FIG. 5 is another portion of the plot of chlorine dioxide against time for the test of FIG. 4.

As the sodium chlorite in a cartridge becomes depleted, unreacted chlorine gas begins to breakthrough in the product stream. A fall in chlorine dioxide production provides evidence of breakthrough. This has been confirmed experimentally by other analytical techniques such as passing the product stream through a flask containing ammonia. When chlorine breakthrough occurs, a white cloud occurs in the flask. FIG. 5 shows a typical test during the time when breakthrough occurs. Table 3 shows the time required for different types of cartridges to breakthrough. It is clear that smaller mesh size pellets lead to longer times to breakthrough, though there appears to be little difference between pellets in the −3+6 mesh range vs. pellets in the −6+12 range. Time to breakthrough is a function of the depth (vertical length) of the cartridge as well as the flux (pounds per hour of chlorine flow per square foot of cartridge cross section). Thus, larger pellets can be used for deeper cartridges with low flux, while smaller pellets are better for shallow cartridges producing high flux.

Tests were also run in which flake material and pellets were sealed in metal cans of about 1 liter volume. Small holes were punched in the can tops. A small propane torch of the type sold in home centers and hardware stores, was used to heat the sides of the cans. After less than 10 seconds of heating, the can containing flakes began to react, making audible sounds and the torch was removed. Within 45 seconds after removal of the torch, the flaked material began to foam up out of the hole in the can top and form a mushroom of hot foam. The reaction continued for 3–4 minutes until all of the sodium chlorite had been converted to foam. Foam overflowing the can set fire to small pieces of combustible material near the can. In one test, the reaction blew the lid off the can.

The can containing pellets was heated by the same propane torch for more than 10 minutes. The side of the can where the flame impinged was glowing red-orange for most of this time. There was no visible reaction except for a small amount of steam venting from the hole in the can top. After 10 minutes, the torch was removed and the can was opened. The pellets immediately adjacent to the can wall where the torch impinged had been melted and apparently decomposed. The pellets immediately surrounding the pellets in the torch impingement area were melted, but apparently not decomposed. The pellets in the rest of the can were soft, but apparently undamaged.

Pellets and flakes were mixed with polyester fiberfill (pillow stuffing) to simulate contact and mixing with finely divided fuel. A propane torch was used to ignite the mixtures. When the torch was applied to the flake mixture, the mixture ignited instantly and flared up consuming the entire mixture in a period of time of from one to two seconds. When the torch was applied to the pellet mix, the fiber melted. If the torch was applied to pellets sitting in molten polyester, the mix in the propane flame burned, but self-extinguished when the torch was removed.

In another test, motor oil was poured onto piles of both flakes and pellets. In both cases the mixture burned vigorously, though the pellets required longer heating with a propane torch before ignition occurred.

The heat testing provides qualitative evidence that the pellets formed according to the invention are much more stable than the commercially available flake material, but that both flakes and pellets can burn when intimately mixed with fuel and ignited.

Figure 3:
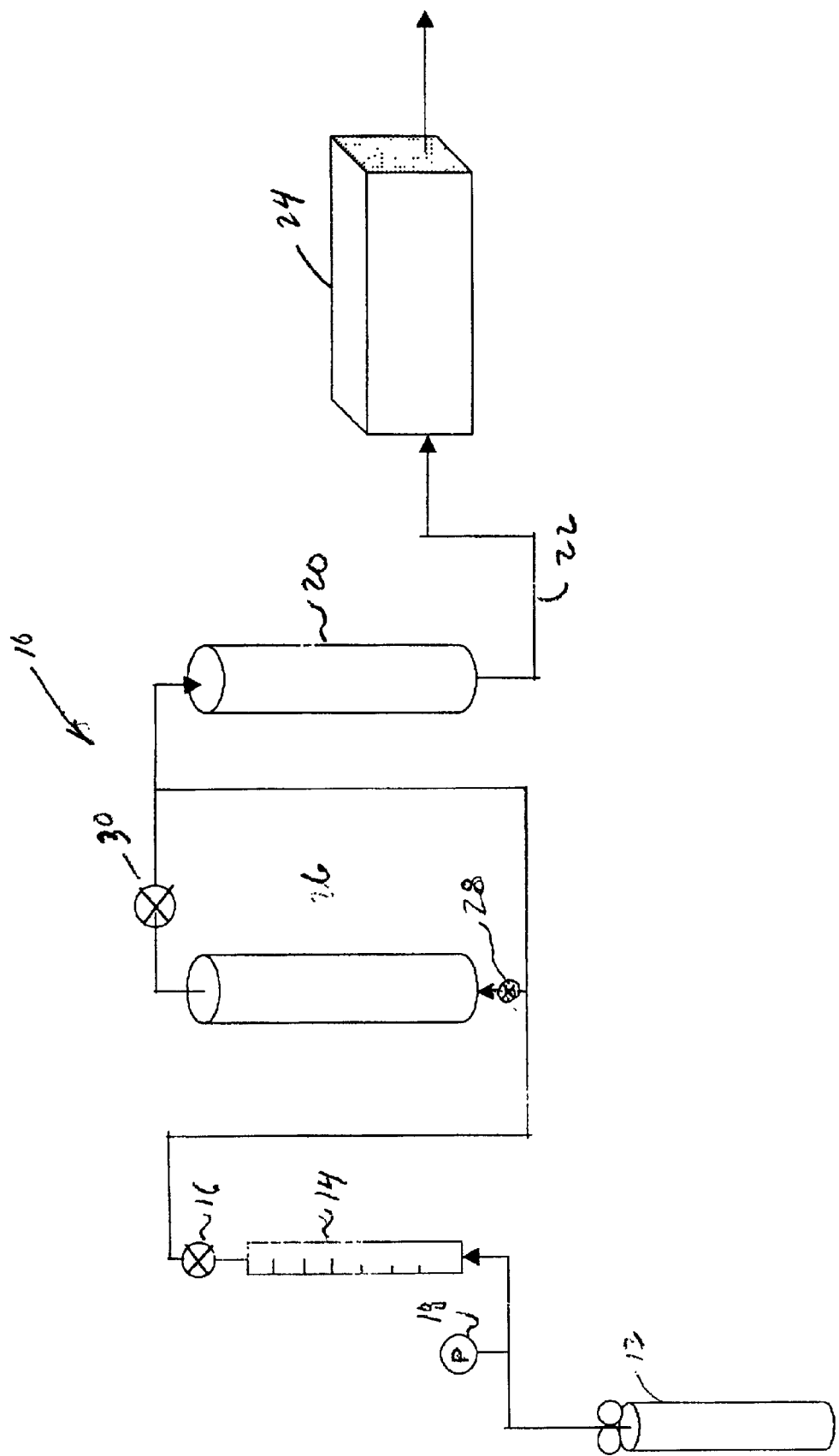
FIG. 3 is a schematic representation of a test apparatus used to evaluate prior art compositions and compositions according to the present invention.

FIG. 3 is a schematic diagram of the test apparatus mixture used to evaluate the use of pellets and flakes in the Gas:Solid process. The apparatus 10 induces a source of gas 12 which is a mixture of 4% chlorine in nitrogen. The gas is passed through a 2 inch diameter cartridge 20 containing a column of about 10 inches long of sodium chlorite. Flow of the gas mixture is regulated by flow control led by valve 16 and measured by flow indicator 14. A pressure gauge 18 is included to measure pressure of the gas mixture exiting source 12. The output represented by line 22 of the cartridge 20 flows through a UV spectrophotometer 24 which measures the concentration of chlorine dioxide. Before the gas flows through the cartridge 20 it can be passed through a humidifier 26, or the humidifier 26 can be by-passed by closing valves 28, 30. If the humidifier 26 is by-passed, the gas flowing into the cartridge has an extremely low relative humidity. Based on the specifications of the gas supplier, the un-humidified gas mixture had a water vapor content of <0.5 ppm.

Figure 4:
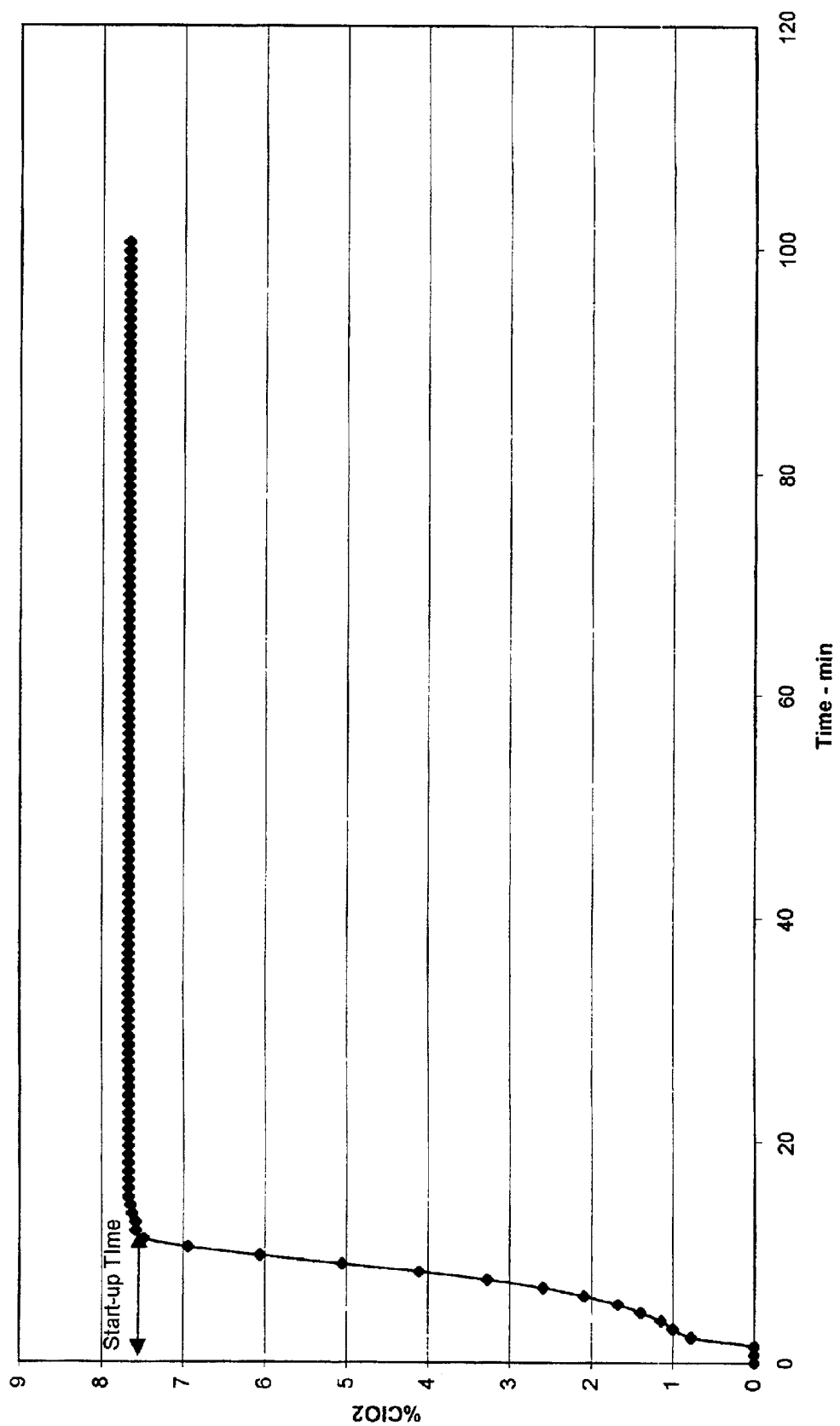
FIG. 4 is a portion of a plot of chlorine dioxide against time for a test using the apparatus at FIG. 3.

FIG. 4 is a plot of the chlorine dioxide concentration of the gas flowing from the cartridge 20 into the spectrophotometer 24 for the beginning of a typical test. All tests were based on a feed gas of 4% chlorine in nitrogen flowing at 3.3 standard cubic feet per hour (scfh). At steady state this produced about 7.7% chlorine dioxide in nitrogen at the outlet of cartridge 20. This is the concentration that is produced if 4% chlorine is nitrogen feed gas reacts completely with sodium chlorite. In all tests, the system was completely purged with nitrogen before the test began. FIG. 4 shows the absorbance of the product stream where the feed gas is humidified and the sodium chlorite is in flake form which does not contain hydrated salts. From FIG. 4 it is apparent about 15 minutes is required before the concentration of the chlorine dioxide stream reaches approximately 7.7%. FIG. 5 shows the end of the same test noted by chlorine breakthrough at the outlet of cartridge 20. From FIG. 5 it can be seen that chlorine breakthrough occurred approximately 406 minutes after the test was begun.

Calculations based on the retention time of the gas in the system indicate that about 0.5 minutes is required for blends of nitrogen and chlorine or chlorine dioxide to displace the nitrogen which fills the system at the start and reach the spectrophotometer. Therefore the start of production is much quicker when the sodium chlorite is in the form of pellets containing hydrated salts, whereas there is a considerably longer delay in production when the cartridge is filled with flakes. The reason for this difference is unknown.

Figure 6:
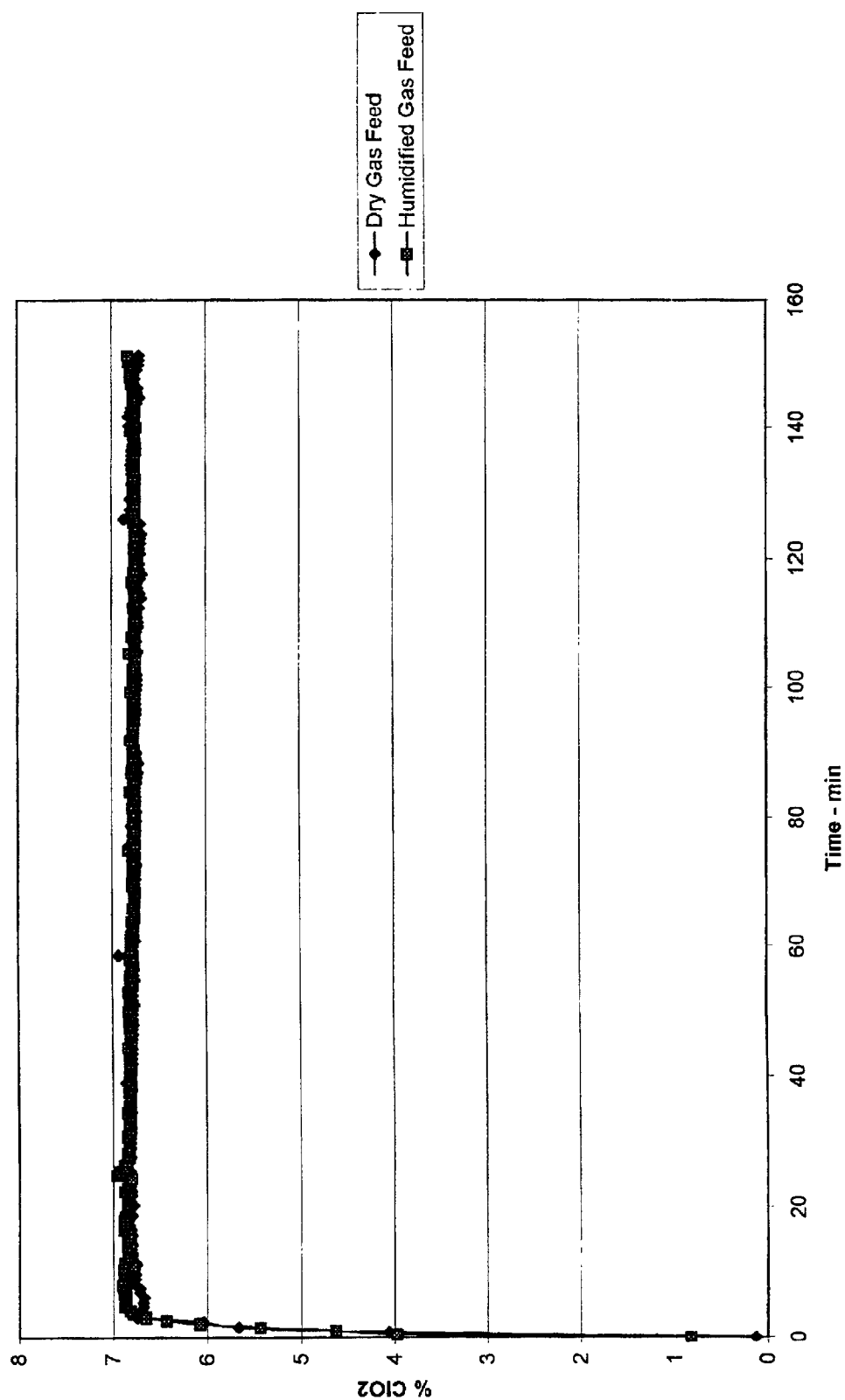
FIG. 6 is a plot of percent chlorine dioxide against time for both dry and humidified gas feed streams using the compositions of the present invention.

U.S. Pat. No. 5,234,678 teaches that humid nitrogen/chlorine (or air/chlorine) feed gas is required in order for the Gas:Solid process to function properly. FIG. 6 shows production of chlorine dioxide in a column using pellets (with hydrated salts) and humidified feed gas vs. production in an essentially identical column using the same type pellets and very dry feed gas. It is believed that water is available for the Gas:Solid reaction from the hydrated salt by mechanisms that are not well understood.

Table 4 shows pressure drop over the length of a cartridge at gas flows of 6.5 scfh and different pellet sizes. This data was gathered using cartridges of 2 inches in diameter with a bed of flakes or pellets 10 inches long. Most cartridges used in production of sodium chlorite in the Gas:Solid process would be 2–5 times longer and would have proportionally higher pressure drop for the same flux. Since, for safety reasons, most of the Gas:Solid generators operate under vacuum or at very low pressure, there is often very little differential pressure to drive the gas through the system. Pressure drop of more than 1–3" of mercury in a column is often problematic. It can be seen that in all cases except the extremely fine −28 mesh pellets, pellets create a much lower pressure drop than flakes for the same gas flux.

TABLE 4

| Materials | Wt (gm) | PRESSURE DROP ACROSS COLUMNS | | |
|---|---|---|---|---|
| | | cm H2O | In H2O | in Hg |
| Vulcan Flake | 588 | 21.2 | 8.35 | 0.614 |
| +3 Mesh Pellets | 454 | 0 | 0 | 0.000 |
| −3 +6 Mesh Pellets | 478 | 2.5 | 0.98 | 0.072 |
| −6 +12 Mesh Pellets | 424 | 1.4 | 0.55 | 0.040 |
| −12 +28 Mesh Pelts | 444 | 8.0 | 3.15 | 0.232 |
| −28 Mesh Pellets | 446 | 181.0 | 71.3 | 5.244 |

These data indicate that pellets larger than 3 mesh may cause premature breakthrough in most practical applications, while pellets smaller than 28 mesh cause excessive pressure drop in most practical applications. Therefore pellets in the −3+28 mesh range are preferred in most applications.

Having thus described our invention what is desired to be secured by Letters Patent of the United States is set forth in the appended claims which should be read without limitation.

What is claimed:

1. A method for producing a stable form of sodium chlorite comprising the steps of:
   a) introducing granular sodium chlorite with one or more hydrating metal salts in an amount sufficient so that when fully hydrated the water of hydration is more than 5% of the anhydrous weight of the sodium chlorite into a pelletizing apparatus;
   b) adding water less than the weight of water required to fully hydrate the salts, but more than 5% of the anhydrous weight of the sodium chlorite; and
   c) recovering pellets being of a size to pass a three mesh screen.

2. A process according to claim 1 including the step of cooling the pellets after they are formed in order to cause solidification.

3. A process according to claim 1 including the step of using a hydrating salt having a melting point greater than 50° C.

4. A process according to claim 1 including the step of adding the hydrating salt in the form of a solution of the salt.

5. A process according to claim 1 including the step of using only salts of sodium.

6. A process according to claim 4 including the steps of:
   using the hydrating salt in solution form having a melting point above 50° C. that is also sufficiently soluble in water in an amount to raise the melting point of the final pellets to more than 50° C., while adding less water than required to fully hydrate the full amount of the hydrating salts.

* * * * *